Patented Dec. 8, 1942

2,304,361

UNITED STATES PATENT OFFICE 2,304,361

METHOD OF MAKING PAPER

William Hoskins, Jr., La Grange, Ill., assignor to Howard D. Meincke

No Drawing. Continuation of applications Serial No. 16,506, April 15, 1935, and Serial No. 144,098, May 21, 1937. This application October 31, 1938, Serial No. 238,063

2 Claims. (Cl. 92—21)

This invention relates to an improved paper filler.

Gypsum has heretofore been used as a paper filler, either dead burnt or in the raw state, in which forms it is subject to the handicap that the retention of material is small, large quantities running off through the Fourdrinier wires.

By means of the present invention, a gypsum filler is produced which is composed of a mass of interlocking needle-like fibers of a mixture, for example, of ten parts filler with 100 parts water and may be retained on a Fourdrinier screen, substantially as well as the paper pulp itself.

In accordance with this invention, a gypsum cement, preferably a quick setting cement, is agitated with water, in such proportions as are desired, for example 10 parts gypsum to 100 parts water, until the cement has passed through its setting period. The agitation may be carried out before or after incorporating the filler in the paper pulp. The gypsum crystals are thereby transformed into long needle-like masses which interlock and mat, causing the material to bulk up very greatly. For example, such a mixture of 10 parts of gypsum and 100 parts of water will produce a semi-solid jelly-like mass which will set up to a considerable depth upon a Fourdrinier screen even without the admixture of paper pulp. A hydrated gypsum which has been heated to a temperature of approximately 260 to 300° F. and preferably between 270 and 290° F., appears to produce a cement best suited to such use. Gypsum burnt in this range will, in general, have a moisture content of, say, 6 to 11½% and preferably 8 to 10%. For example, a cement produced at 270° with a moisture content of 9%, will have a setting period of only one or two minutes, during which agitation is required.

The hydrated gypsum may be raw gypsum, or any gypsum having a water content above that desired in the final product.

Cements heated to a temperature below 270-280 in general tend to set more rapidly, and cements heated above 300 tend to set more slowly, than those produced between these temperatures.

If it is desired to use a slow acting cement, the setting period may be accelerated by the use of well-known accelerators, such as KHSO₄. Likewise a cement having too rapid a setting period may be slowed down by well-known retarders, such as glue, vegetable juices, or the like. A quickly setting cement may likewise be carefully sifted into water to avoid the formation of lumps.

The addition of a minor proportion of papermaker's alum, say, one-half to one per cent, before or during agitation, acts as an individual bulking agent, and further increases retention of the gypsum and the paper pulp.

The cement is first agitated through its setting period and then added to the pulp, either in the beater, in the stuff-chest, or on the screens.

By quick-setting cement is meant, one which will set within a period which it is practicable to use for agitating the cement. Preferably, this period should be short enough so that the mixing and beating given to the filler after adding it to the paper pulp will be long enough so that the gypsum has gone through its setting period before the pulp is passed to the Fourdrinier screens.

The fibrous character of the improved filler not only substantially prevents loss of the gypsum, but also decreases loss of the paper pulp through the Fourdrinier screens.

This application is a continuation of the application of William Hoskins, Jr., Ser. No. 16,506, filed April 15, 1935, and a continuation of application Ser. No. 144,098, filed May 21, 1937.

The foregoing detailed description has been given for clearness of understanding only, and no unnecessary limitations should be understood therefrom, but the appended claims should be construed as broadly as permissible in view of the prior art.

I claim:

1. In the manufacture of paper, the step which comprises adding to wet paper pulp before web formation a paper filler consisting essentially of a slurry of gypsum containing a small amount of alum, amounting to at least 0.5% of the gypsum, the gypsum slurry having been prepared by agitation of a quick setting gypsum cement in water in the presence of the alum through its setting period.

2. A paper filler consisting essentially of a slurry of gypsum containing a small portion, at least 0.5% of alum based on the gypsum, the gypsum slurry having been prepared by agitation of a quick setting gypsum cement in water having been agitated in the presence of the alum through its setting period.

WILLIAM HOSKINS, JR.